United States Patent

Matsunaga et al.

(10) Patent No.: US 9,868,439 B2
(45) Date of Patent: Jan. 16, 2018

(54) VEHICLE CONTROL SYSTEM

(71) Applicant: TOYOTA JIDOSHA KABUSHIKI KAISHA, Toyota-shi (JP)

(72) Inventors: Hitoshi Matsunaga, Toyota (JP); Kazuya Okumura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/424,730

(22) PCT Filed: May 30, 2013

(86) PCT No.: PCT/JP2013/065016
§ 371 (c)(1),
(2) Date: Feb. 27, 2015

(87) PCT Pub. No.: WO2014/034206
PCT Pub. Date: Mar. 6, 2014

(65) Prior Publication Data
US 2015/0246675 A1    Sep. 3, 2015

(30) Foreign Application Priority Data
Aug. 30, 2012 (JP) ................... 2012-190469

(51) Int. Cl.
*B60W 30/045* (2012.01)
*B60T 8/1755* (2006.01)

(52) U.S. Cl.
CPC .......... *B60W 30/045* (2013.01); *B60T 8/1755* (2013.01)

(58) Field of Classification Search
CPC .... B60W 30/045; B60W 10/20; B60W 10/16; B60T 8/1755; B62D 6/003; B62D 7/159; Y02T 10/7258

(Continued)

(56) References Cited

U.S. PATENT DOCUMENTS 5,134,352 A * 7/1992 Matsumoto ........... B60T 8/1755
                                                       303/146
5,842,754 A * 12/1998 Sano ..................... B60T 8/1755
                                                       303/113.5

(Continued)

FOREIGN PATENT DOCUMENTS

| JP | 07-101272 A | 4/1995 |
| JP | 2011-218953 A | 11/2011 |
| JP | 2011-236810 A | 11/2011 |

OTHER PUBLICATIONS

International Search Report dated Jun. 25, 2013 in PCT/JP2013/065016 Filed May 30, 2013.

*Primary Examiner* — Nga X Nguyen
(74) *Attorney, Agent, or Firm* — Oblon, McClelland, Maier & Neustadt, L.L.P.

(57) ABSTRACT

A vehicle control system is provided to execute a turning performance improving control for stabilizing vehicle behavior by controlling drive force during turning. The vehicle control system is provided with: a steering detecting means that detects a steering operation of a driver; a drive force limiting means that restricts the drive force during execution of a turning performance improving control; and a restriction relaxing means that temporarily changes the drive force in a direction of changing the drive force by the turning performance improving control, if the steering operation of the driver detected by the steering detecting means while restricting the drive force by the drive force limiting means is carried out to increase a steering angle during execution of the turning performance improving control.

11 Claims, 8 Drawing Sheets

(58) Field of Classification Search
USPC .......... 701/1, 70, 41–42; 180/446, 443, 421
See application file for complete search history.

(56) References Cited

U.S. PATENT DOCUMENTS

| | | | |
|---|---|---|---|
| 2004/0148077 A1* | 7/2004 | Yasui | B60T 8/172 701/41 |
| 2005/0192728 A1* | 9/2005 | Yasui | B60G 17/0162 701/38 |
| 2009/0051216 A1* | 2/2009 | Maeda | B60L 15/2036 303/146 |
| 2009/0118907 A1* | 5/2009 | Joe | B60W 10/20 701/42 |
| 2013/0054073 A1* | 2/2013 | Kageyama | B60W 10/04 701/22 |
| 2013/0268162 A1* | 10/2013 | Ponziani | B60W 30/00 701/48 |

* cited by examiner

VEHICLE CONTROL SYSTEM

TECHNICAL FIELD

The present invention relates to a vehicle control system that improves turning performance of a vehicle to stabilize vehicle behavior during turning traveling by controlling drive force and braking force of the vehicle.

BACKGROUND ART

A technology concerning turning performance improving control has been developed which improves turning performance of a vehicle to stabilize behavior or a posture of the vehicle by automatically controlling drive force and braking force generated in the vehicle in accordance with a steering operation performed by a driver. As one example, Japanese Patent Laid-Open No. 2011-218953 discloses an invention concerning a drive force control apparatus that controls drive force of driving wheels so that steering characteristics of a vehicle follow target steering characteristic. In the invention described in this Japanese Patent Laid-Open No. 2011-218953, drive force that is increased to relatively improve the steering characteristics of the vehicle is obtained with respect to basic drive force of the driving wheels acquired from a driver's intension. Further, a plurality of upper limit values of the drive force to be increased are calculated based on a plurality of conditions, the drive force to be increased is limited by the smallest upper limit value in the plurality of upper limit values, and a final increment of the drive force is obtained. Specifically, control amount upper limit values are calculated in accordance with longitudinal acceleration of the vehicle, lateral acceleration of the vehicle, and a road surface gradient, respectively. Furthermore, the drive force is controlled to output drive force limited by the smallest one in these upper limit values.

Japanese Patent Laid-Open No. 2011-236810 discloses an invention concerning a vehicle drive force control apparatus that controls drive force to change a stability factor of a vehicle following a target value. In the invention described in Japanese Patent Laid-Open No. 2011-236810, the target value of the stability factor is obtained based on a drive force increase request, and a correction amount of the stability factor is calculated based on a difference between the target value of the stability factor and an actual value of the stability factor. Then, the drive force is increased to reduce a difference between the target value and the actual value of the stability factor.

In turn, Japanese Patent Laid-Open No. 7-101272 discloses an invention intended to estimate a vehicle driving operation state of a driver that is hard to directly represent in physical quantity such as vehicle speed and provide vehicle driving characteristics matched with a result of this estimation. In the invention described in Japanese Patent Laid-Open No. 7-101272, a neural network that receives average values and variances of respective parameters provided by frequency analysis of vehicle driving parameters, e.g., vehicle speed as well as parameters representing road traffic situations performs nonlinear transformation with respect to a weighted total sum of the average values and the variances of the vehicle driving parameters and the parameters of the road traffic situations to obtain an output parameter representing the vehicle driving operation state. Furthermore, the vehicle driving characteristics are changed in accordance with this output parameter.

In the respective inventions described in Japanese Patent Laid-Opens No. 2011-218953 and No. 2011-236810, so-called turning performance improving control is carried out. In the invention described in Japanese Patent Application Laid-Open No. 2011-236810 of these inventions, drive force of a vehicle is controlled so that a stability factor of the vehicle follows a target stability factor. Thus, vehicle behavior during turning traveling can be stabilized to improve turning performance of the vehicle. In such conventional turning performance improving control as described in Japanese Patent Laid-Open No. 2011-236810, drive force or braking force of a vehicle is automatically controlled aside from an increase or a decrease in drive force and braking force caused by an accelerator operation or a brake operation of a driver. Thus, there is a problem that the drive force (or the braking force) fluctuates without the driver's intention and the driver feels this fluctuation as uncomfortableness or shocks.

As regards such a problem, like the invention described in Japanese Patent Laid-Open No. 2011-218953, providing a limit value to a control amount of the drive force at the time of executing the turning performance improving control is considered. For example, as shown in FIG. 7, a drive force limit value tqgd is usually set to the drive force output to follow a required drive force. In the example shown in FIG. 7, when steering begins and a vehicle makes a turn, the turning performance improving control is executed, which results in a reduction in actual drive force of the vehicle. Moreover, the reduction in this actual drive force is limited with the limit of the drive force limit value tqgd.

A limit value that limits a control amount of the drive force in the turning performance improving control can be preset by, e.g., drive tests or simulations as a limit value that prevents a driver from feeling uncomfortableness or shocks. Additionally, applying the concept of Weber's law "a differential threshold of stimuli ($\Delta X$) varies in proportion to intensity of reference stimuli (X) ($\Delta X/X$=constant)", the limit value of a control amount can be set as a variable value. That is, determining the limit value of a control amount in accordance with a level of the control amount can be also considered. As described above, setting a limit to the control amount of the drive force at the time of performing the turning performance improving control enables preventing or suppressing a driver from feeling uncomfortableness or shocks caused due to a change in drive force during turning traveling.

However, when the control amount of the drive force is restricted at the time of performing the turning performance improving control, a factor different from that described above may possibly bring uncomfortableness to a driver. That is, changing the drive force during turning traveling can suppress the uncomfortableness the driver feels. However, when the control amount of the drive force is restricted, control effect of the turning performing improving control is lowered. Further, when the control effect is lowered, the control effect of the turning performance improving control expected by the driver is not provided, which may possibly lead to different comfortableness to the driver.

In particular, when a so-called steering angle increasing operation is carried out to again increase a steering angle once fixed at a predetermined angle at the time of turning traveling, a difference between the expected control effect and actually provided control effect, i.e., insufficiency of the actually provided control effect becomes prominent. Consequently the driver is prone to the uncomfortableness or shocks. For example, as shown in FIG. 8, when the steering angle increasing operation is performed, actual drive force is limited by the drive force limit value tqgd, whereas required drive force required to provide appropriate control effect increases (in an example shown in this FIG. 8, it increases toward a negative side or a braking side). Consequently, the required drive force considerably deviates from the actual drive force, and the driver may feel different uncomfortableness that prevents the expected control effect of the turning performance improving control from being provided depending on circumstances.

It is to be noted that not only the control amount of the drive force of the vehicle is restricted to reduce the uncomfortableness or shocks at the time of performing the turning performance improving control as described above but also the control amount may be restricted in association with management of operation states of an engine or states of a battery. Even in such a case, like the limitation for reduction of the uncomfortableness or the shocks described above, the control amount of the drive force is limited, and hence the control effect of the turning performance improving control is lowered.

Thus, the conventional control systems have to be improved to carry out the turning performance improving control for stabilizing vehicle behavior during turning for the purpose of enhancing control effect while reducing uncomfortableness or shocks to a driver.

SUMMARY OF INVENTION

In view of the above-described technical problem, it is therefore an object of the present invention to provide a vehicle control system configured to ensure control effect of a turning performance improving control for improving turning performance of a vehicle by controlling drive force and braking force of the vehicle, without giving uncomfortableness or shocks to a driver.

The vehicle control system according to the present invention is configured to carry out a turning performance improving control for stabilizing vehicle behavior by controlling drive force during turning. In order to achieve the above-explained objective, the vehicle control system is provided with: a steering detecting means that detects a steering operation of a driver; a drive force limiting means that restricts the drive force during execution of a turning performance improving control; and a restriction relaxing means that temporarily changes the drive force in a direction of changing the drive force by the turning performance improving control, if the steering operation of the driver detected by the steering detecting means while restricting the drive force by the drive force limiting means is carried out to increase a steering angle during execution of the turning performance improving control.

Specifically, the drive force limiting means is configured to restrict a control amount of the drive force by a predetermined limit value during controlling the drive force by the turning performance improving control. The restriction relaxing means is configured to temporarily change the drive force by temporarily changing the limit value in a direction to increase the control amount.

The steering detecting means is configured to obtain a steering angular velocity. The restriction relaxing means is configured to determine a fact that the steering operation is carried out to increase the steering angle if the steering angular velocity is increased after stabilized or decreased.

The steering detecting means is further configured to obtain a steering angular acceleration. The restriction relaxing means is further configured to determine a fact that the steering operation is carried out to increase the steering angle if the steering angular acceleration is increased after decreased.

The drive force limiting means is further configured to restrict the drive force or the control amount by restricting an output of a prime mover of the vehicle. The restriction relaxing means is further configured to temporarily change the drive force or temporarily increase the control amount by controlling a braking device of the vehicle when restricting the drive force or the control amount by restricting the output of the prime mover.

Thus, the vehicle control system carries out the turning performance improving control for stabilizing a vehicle behavior during turning by automatically controlling drive force of the vehicle. Specifically, the drive force is restricted by the turning performance improving control. According to the present invention, therefore, uncomfortableness and shocks resulting from changing the drive force can be reduced during the turning performance improving control. In addition, the prime mover such as an engine and a motor can be operated properly and a battery can be managed appropriately. Moreover, when the steering angle is increased by the driver during execution of the turning performance improving control, the restriction of the drive force is temporarily relaxed to reduce the uncomfortableness resulting from changing the drive force, and to control the prime mover and the battery. Therefore, the control effect of the turning performance improving control will not be deteriorated due to shortage of the drive force even if the steering angle is increased during execution of the turning performing improving control and the turning performance is expected to be improved. For this reason, the turning performance can be improved even if the steering angle is increased during turning. In addition, the driver can be prevented from feeling different uncomfortableness caused due to unattainability of the expected control effect of the turning performance improving control, by appropriately performing the turning performance improving control according to the present invention.

It is to be noted that the drive force to be automatically controlled by the turning performance improving control includes not only a drive force in a positive direction for propelling the vehicle but also a drive force in a negative direction that decelerates the vehicle, i.e., braking force. For example, in case of changing the drive force in the positive direction, an output power of the prime mover is increased. Otherwise, if the braking force has already been generated, the braking force is reduced. By contrast, in case of changing the drive force in the negative direction, an output power of the prime mover is reduced. Alternatively, the braking force is applied to the vehicle or increased.

As described, the control amount (or a variation) of the drive force is restricted by the predetermined limit value during the turning performance improving control. In addition, when the steering angle is increased by the driver during execution of the turning performing improving control, the limit value of the control amount of the drive force is temporarily changed in a direction to increase the control amount. That is, the restriction of changing the drive force under the turning performance improving control is temporarily relaxed. Consequently, the drive force can be temporarily changed a changing direction under the turning performance improving control.

According to the present invention, specifically, a steering operation during the turning is detected to determine if the steering angle is increased. To this end, specifically, a changing tendency of a steering angular velocity during the steering operation is obtained, and an increment of the steering angle is determined based on the changing tendency of the steering angular velocity. Specifically, when the steering angular velocity has become temporarily constant and the steering angular velocity has again increased during the turning, the control system determines that the steering angle is increased. Alternatively, when the steering angular velocity has been decreased and then increased again, the control system determines that the steering angle is increased. Thus, an increment of the steering angle during turning can be determined accurately based on the steering angular velocity and the changing tendency thereof. Consequently, the turning performance of the vehicle can be improved.

Instead, an increment of the steering angle may also be determined based on steering angular acceleration and a changing tendency thereof. Specifically, when the steering angular acceleration has been temporarily decreased and then increased again during turning, the control system determines that the steering angle is increased. Thus, an increment of the steering angle during turning can be determined accurately based on the steering angular acceleration and the changing tendency thereof. Consequently, the turning performance of the vehicle can be improved.

Additionally, according to the present invention, the drive force or the control amount thereof is restricted during executing the turning performance improving control by controlling an output power of the prime mover. Such restriction of the drive force or the control amount can be temporarily relaxed by generating a braking force of the braking device to temporarily change the drive force or temporarily increases the control amount. That is, the drive force is temporarily changed in the negative direction or the control amount of the drive force is temporarily increased. Consequently, a control range of the drive force can be expanded in case of temporarily relaxing the restriction of the drive force or the control amount thereof. For this reason, the drive force can be controlled properly to achieve the required drive force during the turning performance improving control so that the turning performance of the vehicle can be improved.

DESCRIPTION OF THE PREFERRED EMBODIMENT(S)

Figure 1:
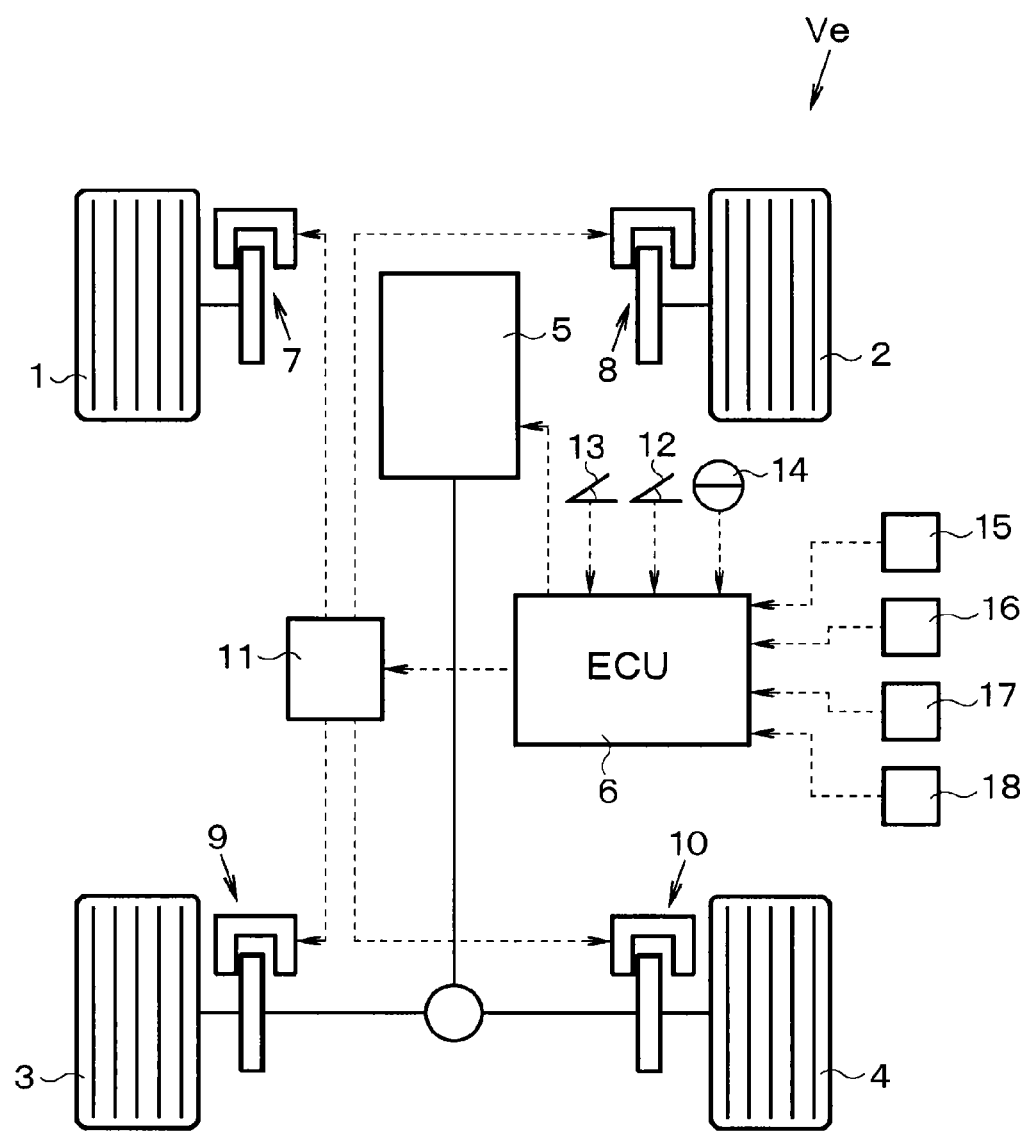
FIG. 1 is a schematic view showing an example of a structure of a vehicle and a control system to which the present invention is applied.

An embodiment according to the present invention will now be described with reference to the accompanying drawings. First, a structure of a vehicle and a control system to which the present invention is applied will be explained with reference to FIG. 1. In the vehicle to which the present invention is applied, drive force and braking force can be controlled independent of an accelerator operation or a braking operation performed by a driver. That is, in the vehicle to which the present invention is applied, the drive force and the braking force can be controlled not only manually based on the driving operations of the driver but also automatically. A vehicle Ve shown in FIG. 1 has a left front wheel 1, a right front wheel 2, a left rear wheel 3, and a right rear wheel 4. Specifically, the vehicle Ve shown in FIG. 1 is a rear-wheel drive layout vehicle in which the rear wheels 3 and 4 are rotated by power of a prime mover 5.

For example, not only an internal-combustion engine but also an electric motor may be employed as the prime mover 5 of the vehicle Ve. Alternatively, a hybrid drive unit comprised of the internal-combustion engine and the electric motor may also be employed as the prime mover 5. Given that the internal-combustion engine, e.g., a gasoline engine, a diesel engine, or a natural gas engine is used as the prime mover 5, a transmission (not shown) such as a manual transmission or an automatic transmission is disposed on an output side of the prime mover 5. Instead, given that the electric motor is used as the prime mover 5, an electric storage device such as a battery or a capacitor (each of which is not shown) is connected to the electric motor through an inverter or the like.

In order to control drive force of the prime mover 5 rotating the rear wheels 3 and 4, the vehicle Ve is provided with an electronic control unit (ECU) 6. To this end, the ECU 6 is connected to the prime mover 5 so that an output of the prime mover 5 can be controlled to automatically control the drive force of the vehicle Ve generated by the rear wheels 3 and 4 serving as driving wheels.

The respective wheels 1, 2, 3, and 4 are provided with braking devices 7, 8, 9, and 10 respectively. These respective braking devices 7, 8, 9, and 10 are connected to the ECU 6 through a brake actuator 11. That is, the brake actuator 11 is controlled by the ECU 6 in a manner such that the braking devices 7, 8, 9, and 10 are individually controlled to adjust braking forces applied to the vehicle Ve.

The ECU 6 is configured to receive detection signals from various sensors arranged in the vehicle Ve and information signals from other on-vehicle devices. For example, the ECU 6 receives detection signals from an accelerator sensor 12 that detects a depression angle of an accelerator pedal (or a depression amount, or an opening degree of an accelerator), a brake sensor 13 that detects a depression angle of a brake pedal (or a depression amount or an opening degree of the brake device), a steering angle sensor 14 that detects a steering angle of a steering wheel, a wheel speed sensor 15 that detects rotational speeds (wheel speeds) of the respective wheels 1, 2, 3, and 4, a longitudinal acceleration sensor 16 that detects longitudinal acceleration of the vehicle Ve (i.e., in a vertical direction in FIG. 1), a lateral acceleration sensor 17 that detects lateral acceleration of the vehicle Ve (i.e., in a horizontal direction in FIG. 1), a yaw rate sensor 18 that detects a yaw rate of the vehicle Ve, a torque sensor (not shown) that detects output torque of the prime mover 5, and so on.

In order to improve turning performance of the vehicle Ve thus structured, steering characteristics or a stability factor of the vehicle Ve are controlled during turning. To this end, for example, vehicle speed and a friction coefficient of a road surface are estimated from rotational speeds of the wheels 1, 2, 3, and 4 detected by the wheel speed sensor 15, and a target steering characteristics is determined based on the estimated vehicle speed and the friction coefficient, and a steering angle detected by the steering angle sensor 14. Then, actual steering characteristic of the vehicle Ve is controlled to achieve the target steering characteristic.

Specifically, the target steering characteristics can be achieved by controlling a yaw rate of the vehicle Ve while changing drive force and braking force, that is, by carrying out the turning performance improving control. In order to control the yaw rate of the vehicle Ve, a current target yaw rate of the vehicle Ve is calculated based on e.g., a vehicle speed, a steering angle, a wheelbase and etc. Then, an actual yaw rate of a vehicle Ve is controlled to achieve the target yaw rate by carrying out the turning performance improving control. Specifically, the yaw rate of the vehicle Ve is controlled by adjusting a driving torque applied to the driving wheels 3 and 4 or a braking torque applied to the respective wheels 1, 2, 3, and 4 based on a correction torque.

For example, Japanese Patent Laid-Open No. 5-278488 describes the control for adjusting an actual yaw rate to achieve a target yaw rate of a vehicle. Japanese Patent Laid-Open No. 2011-218953 also describes a control for adjusting drive force of driving wheels in a manner such that the steering characteristics is adjusted to achieve the target steering characteristics. In turn, Japanese Patent Laid-Open No. 2011-236810 describes a control for adjusting drive force of driving wheels in a manner such that a stability factor of a vehicle is adjusted to achieve a target value. Thus, basic control contents of the turning performance improving control for automatically controlling the drive force of the vehicle to stabilize behavior or posture of the vehicle during turning are taught by the above-mentioned prior art documents, and hence a further specific description will be omitted.

As described, the conventional turning performance improving control has two conflicting objects, i.e., to achieve sufficient control effect and to prevent a driver from feeling uncomfortableness or shocks. In order to avoid uncomfortableness or shocks and to control the prime mover 5 and a battery when a steering angle is increased during execution of the turning performance improving control, the vehicle control system according to the present invention temporarily relaxes a restriction of a control amount of drive force. Thus, the control amount of drive force is limited not only to avoid uncomfortableness or shocks but also to control the prime mover 5 and a battery. However, an example intended to avoid the uncomfortableness or shocks involved in the turning performance improving control will be described in the following.

Figure 2:
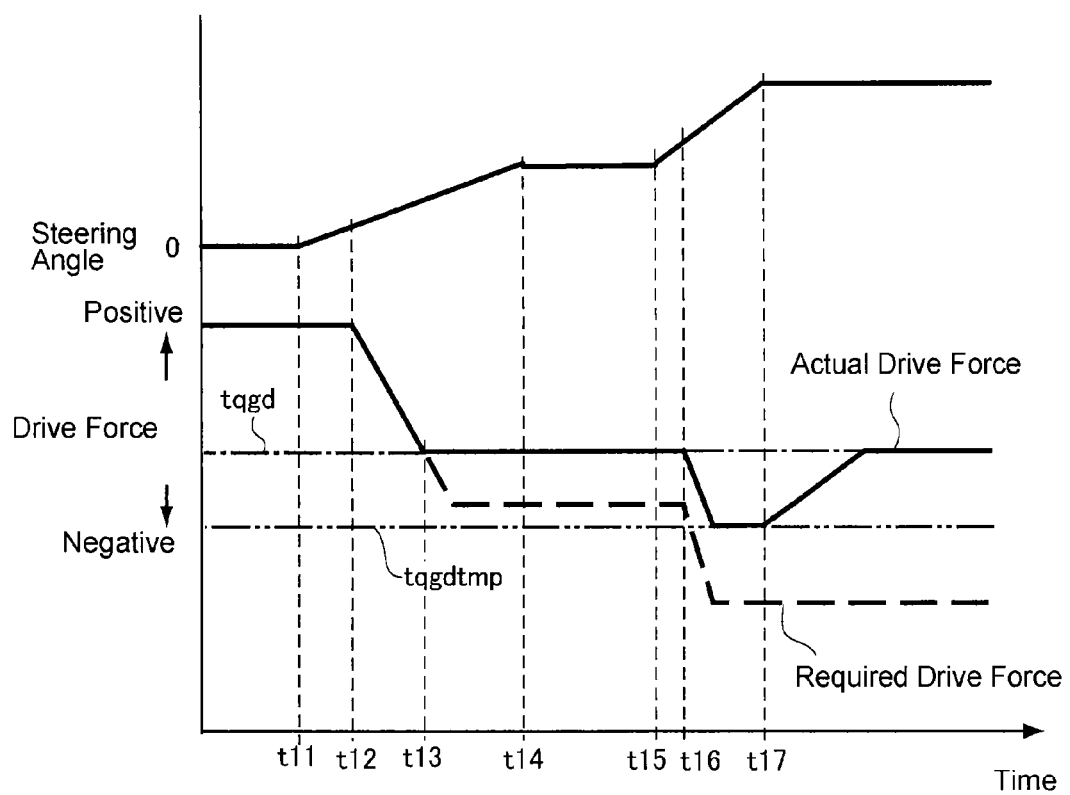
FIG. 2 is a time chart for explaining an example of turning performance improving control carried out by a control system according to the present invention.

Referring now to FIG. 2, there is shown a time chart indicating a change in drive force of the vehicle Ve during execution of the turning performance improving control according to the preferred example of the present invention. In the example shown in FIG. 2, a steering angle starts increasing at point t11, and the turning performance improving control is commenced at point t12 when the steering angle exceeds a predetermined angle. That is, the drive force is controlled to stabilize behavior of the vehicle Ve during turning. Specifically, the drive force of the vehicle Ve is controlled to be increased in the negative direction. In other words, the drive force of the vehicle Ve is reduced in a predetermined control amount.

The control amount of the drive force is transmitted as a required drive force so that an actual drive force of the vehicle Ve is lowered toward the required drive force. In this event, as the conventional art, a limit value tqgd of the control amount of the drive force is set during execution of the turning performance improving control. Therefore, the actual drive force of the vehicle Ve is limited by the limit value tqgd and stabilized after point t13. Specifically, the limit value tqgd is a maximum value of the control amount of drive force that is possible to change the drive force during the turning performance improving control without causing discomfort and shocks. Additionally, the limit value tqgd may be set in both a positive direction to increase the drive force and a negative direction to reduce the drive force, and FIG. 2 shows an example the limit value tqgd of the control amount is set in the negative direction to reduce the drive force. To this end, the limit value tqgd is determined based on results of drive tests or simulations. Alternatively, the limit value tqgd may also be determined based on the above-described Weber's law.

According to the present invention, the control system is configured to determine whether or not a steering angle is increased by the driver during execution of the turning performance improving control. Here, a steering operation for further increasing a steering angle during turning will be called a "steering angle increasing operation" in the following description. For example, the control system determines an execution of the steering angle increasing operation when a steering angle is further increased during turning at a predetermined steering angle. Alternatively, it is also possible to determine an execution of the steering angle increasing operation when a speed of the steering operation is further increased during turning at a predetermined steering speed. According to the example shown in FIG. 2, the steering angle of the vehicle Ve becomes constant from point t14, and further increased at point t15. Then when the steering angle exceeds a predetermined angle at point t16, the control system determines a fact that the steering angle increasing operation is executed.

When the execution of the steering angle increasing operation is determined at the point t16, the restriction of the drive force is relaxed. Specifically, the upper limit of the control amount of the drive force is altered from the limit value tqgd to a limit value tqgdtmp for increasing a control amount. To this end, the limit value tqgdtmp is set to be larger in the positive direction or the negative direction of the drive force than the limit value tqgd. In the example shown in FIG. 2, the limit value tqgdtmp is set to be larger than the limit value tqgd in the negative direction of the drive force.

More specifically, the limit value tqgdtmp is set in a manner such that uncomfortableness or shocks will not be caused even if the control amount of the drive force is temporarily increased when the angle increasing operation is carried out. If the driver executes the angle increasing operation during turning, the driver can expect or recognize a change in the behavior of the vehicle Ve or a change in the drive force resulting from the turning performing improving control. Therefore, if the steering angle increasing operation is executed by the driver during the turning performance increasing control, the drive force can be controlled with a larger control amount than that of a case in which the steering angle increasing operation is not executed by the driver during the turning performance increasing control. For this reason, according to the present invention, the control system is configured to temporarily raise the upper limit of the control amount of the drive force from the regular limit value tqgd to the limit value tqgdtmp when the steering angle increasing operation is carried out.

As the limit value tqgd, the limit value tqgdtmp may also be determined based on results of drive tests or simulations. Alternatively, the limit value tqgdtmp may also be determined based on the Weber's law. In addition, accuracy of the limit value tqgdtmp may be improved by determining the limit value tqgdtmp while taking account of a yaw rate, a lateral acceleration, or a longitudinal acceleration of the vehicle Ve.

When the steering angle increasing operation is carried out during execution of the turning performance improving control, it is necessary to control the drive force with a larger control amount than that under the normal turning performance improving control so as to properly achieve control effect of the turning performance improving control. That is, as indicated in FIG. 2, the required drive force is increased in the negative direction. According to the present invention, therefore, the upper limit of the control amount of the drive force is increased in response to an increase in the required drive force thereby reducing a deviation between the required drive force and the actual drive force. For this reason, the control effect of the turning performance improving control can be achieved properly even if the angle increasing operation is executed.

Then, when the steering angle increasing operation is terminated at point t17 so that the steering angle is fixed at a predetermined angle, the control amount of the drive force that has been restricted by the limit value tqgdtmp is restricted by the regular control value tqgd. That is, the temporal relaxation of the restriction of the drive force carried out in conjunction with the steering angle increasing operation is terminated so that the drive force is restricted by the normal way of the turning performance improving control. Optionally, the relaxation of the restriction of the drive force may also be terminated after a lapse of predetermined period of time from a commencement of the relaxation.

In addition, under the turning performance improving control, it is possible to control different devices when restricting the control amount of the drive force, and when relaxing the restriction of the control amount of the drive force. For example, in case of increasing the drive force in the negative direction during the turning performance improving control as shown in FIG. 2, the drive force and the control amount thereof can be restricted by controlling an output and a changing amount of the prime mover 5 as an engine. By contrast, the restriction of the drive force can be relaxed by controlling or increasing the braking forces achieved by the braking devices 7, 8, 9, and 10.

The turning performance improving control can be carried out properly by thus controlling the output of the prime mover 5 and the braking forces of the braking devices 7, 8, 9, and 10 depending on the situation. To this end, specifically, the control amount of the drive force is restricted by restricting the output of the prime mover 5, and the restriction of the drive force is temporarily relaxed by controlling the braking forces of the braking devices 7, 8, 9, and 10 to temporarily increase the control amount of the drive force. Therefore, a possible control rage of the drive force including the drive force in the negative direction, i.e., the braking force can be widened. Consequently, a degree of freedom in the control on the drive force in the turning performance improving control can be increased, thereby appropriately carrying out the turning performance improving control.

It is to be noted that continuously controlling the braking devices 7, 8, 9, and 10 for a long period of time is not preferable in lights of durability or heat generation of the braking devices 7, 8, 9, and 10, but the braking devices 7, 8, 9, and 10 may be temporarily controlled for relaxation of the restriction of the drive force as described above.

Figure 3:
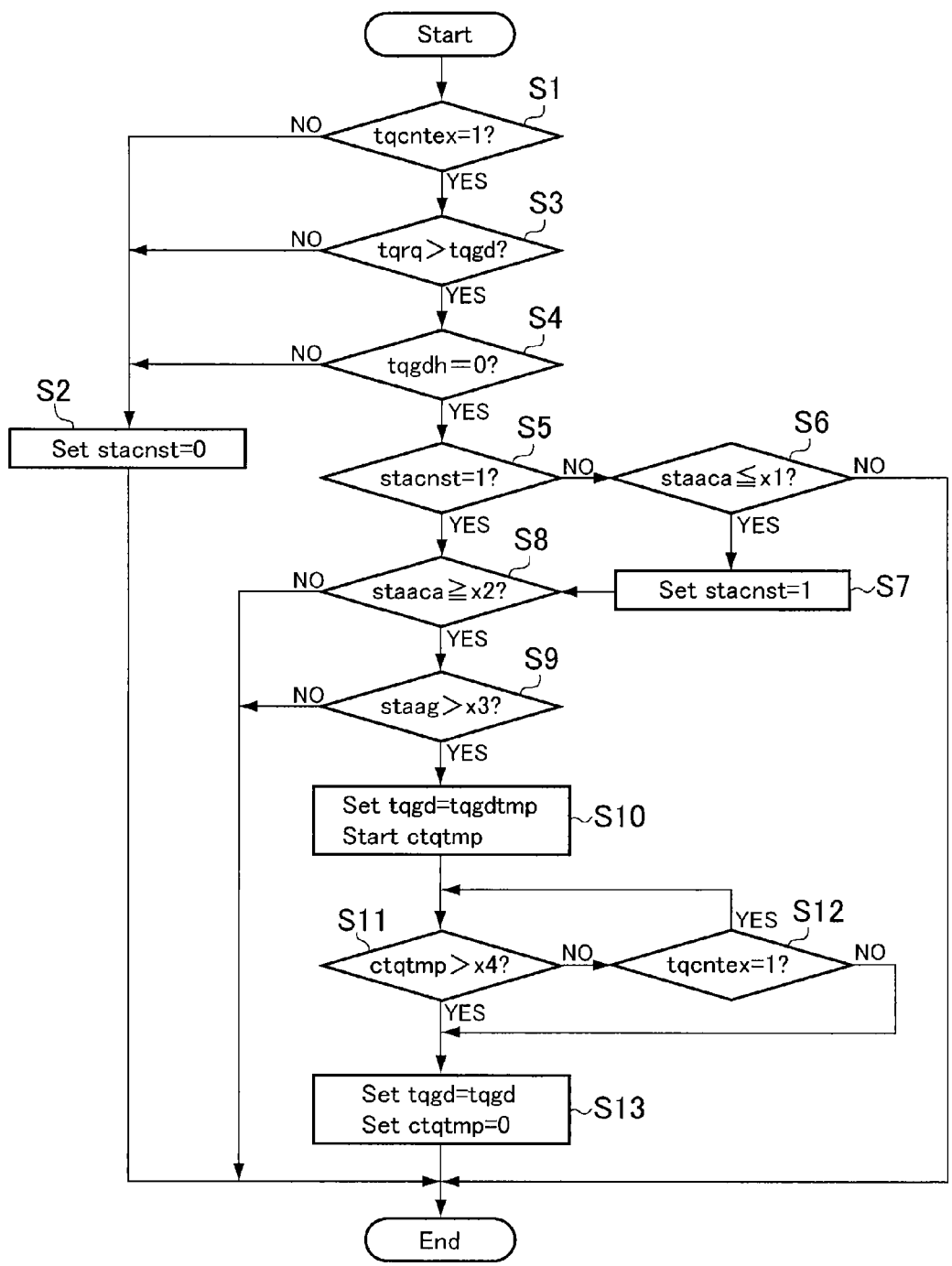
FIG. 3 is a flowchart for explaining another example of turning performance improving control carried out by the control system according to the present invention.

FIG. 3 is a flowchart for explaining another example of the turning performance improving control according to the present invention, and a routine shown in this flowchart is repeated at predetermined short intervals. First of all, an execution state of the turning performance improving control is determined (a step S1). Specifically, it is determined whether or not an execution flag tqcntex of the turning performance improving control is set to "1". The execution flag tqcntex is set to "1" in case of executing the turning performance improving control or set to "0" in case of terminating the turning performance improving control. Here, this execution flag tqcntex is set to "0" at the beginning of this control.

If the execution flag tqcntex is set to "0" so that the answer of step S1 is NO, the routine advances to step S2 to set a steering operation determination flag stacnst to "0", and then the routine is ended. Here, the steering operation determination flag stacnst is used to determine an execution of the steering operation by the driver. Specifically, the flag stacnst is set to "1" when the steering operation is performed at a steering angular velocity staaca that is lower than a predetermined angular velocity×1 at below-described steps S6 and S7, and set to "0" in any other case.

By contrast, if the execution flag tqcntex is set to "1" so that the answer of step S1 is YES, the routine advances to step S3 to determine whether or not a required drive force tqrq under the turning performance improving control exceeds the limit value tqgd of the drive force. That is, it is determined whether or not the drive force is restricted by the limit value tqgd. As described, the limit value tqgd of the drive force is set in a manner such that uncomfortableness or shocks will not be caused as a result of changing the drive force of the vehicle Ve with the predetermined control amount during the turning performance improving control.

If the required drive force tqrq is smaller than the limit value tqgd, that is, if the drive force control during the turning performance improving control has not yet been restricted so that the answer of step S3 is NO, the routine advances to step S2. Then, the steering operation determination flag stacnst is set to "0" and the routine is ended.

By contrast, if the required drive force tqrq is larger than the limit value tqgd, that is, if the drive force control during the turning performance improving control is restricted so that the answer of step S3 is YES, the routine advances to step S4. At step S4, it is determined whether or not the restriction of the drive force control in execution is intended to prevent an overheating of the prime mover 5 and to protect the battery, that is, to ensure durability of the vehicle Ve. At step S4, specifically, it is determined whether or not a restriction state determination flag tqgdh is set to "0". This determination flag tqgdh is set to "1" when restricting the control amount of the drive force to ensure durability of the vehicle Ve, and set to "0" in any other case.

If the restriction state determination flag tqgdh is set to "1", that is, if the control amount of the drive force is restricted to ensure durability of the vehicle Ve so that the answer of step S4 is NO, the routine advances to step S2. Then, the steering operation determination flag stacnst is set to "0" and the routine is ended.

By contrast, if the restriction state determination flag tqgdh is set to "0", that is, if the control amount of the drive force is not restricted to ensure durability of the vehicle Ve so that the answer of step S4 is YES, the routine advances to step S5. In other words, if the control amount of the drive force is restricted by the control value tqgd for preventing uncomfortableness or shocks during the turning performance improving control, the routine advances to step S5.

At step S5, specifically, it is determined whether or not the steering operation determination flag stacnst is set to "1".

If the steering operation determination flag stacnst is set to "0" so that the answer of step S5 is NO, the routine advances to step S6 to determine whether or not the speed of the steering operation, that is, a steering angular velocity staaca is lower than or equal to a predetermined steering angular velocity×1.

If the steering angular velocity staaca is higher than the steering angular velocity×1 so that the answer of step S6 is NO, the routine is ended without carrying out subsequent controls.

By contrast, if the steering angular velocity staaca is lower than or equal to the steering angular velocity×1 so that the answer of step S6 is YES, the routine advances to step S7 to set the steering operation determination flag stacnst to "1", and further advances to step S8. Meanwhile, if the steering operation determination flag stacnst is set to "1" so that the answer of step S5 is YES, the routine advances directly to step S8.

At the step S8, specifically, it is determined whether or not the steering angular velocity staaca that is lower than the steering angular velocity×1 has been increased to be equal to or higher than a predetermined steering angular velocity×2. That is, the steering angular velocity×1 and the steering angular velocity×2 are threshold values to determine an execution of the steering angle increasing operation, and to this end, the steering angular velocity×2 is set to be higher than the steering angular velocity×1.

If the steering angular velocity staaca is not increased from the speed lower than the steering angular velocity×1 to exceed the steering angular velocity×2 so that the answer of step S8 is NO, the routine is ended without carrying out subsequent controls. In this case, the steering angular velocity staaca is not increased significantly from the speed lower than the steering angular velocity×1 and hence the control system determine a fact that the steering angle increasing operation is not carried out. If the answer of step S8 is NO, the routine is ended.

By contrast, if the steering angular velocity staaca has been increased from the speed lower than the steering angular velocity×1 to be equal to or higher than the steering angular velocity×2 so that the answer of step S8 is YES, the routine advances to step S9 to determine whether or not a current steering angle staag is larger than a predetermined steering angle×3. That is, it is determined whether or not the steering angle increasing operation has been carried out.

As described, an execution of the steering angle increasing operation is determined at step S8 based on an increment of the steering angular velocity staaca from the speed lower than the steering angular velocity×1 to the steering angular velocity×2. In addition, an accuracy of the execution of the steering angle increasing operation is enhanced at step S9 based on the steering angle staag.

If the steering angle staag is smaller than the steering angle×3, that is, if the steering angle increasing operation has not yet been carried out or completed so that the answer of step S9 is NO, the routine is ended without carrying out subsequent controls.

By contrast, if the steering angle staag is larger than the steering angle×3, that is, if the steering angle increasing operation has been carried out so that the answer of step S9 is YES, the routine advances to step S10 to alter the limit value tqgd of the control amount of the drive force control during the turning performance improving control to the limit value tqgdtmp. Consequently, the restriction of the drive force is relaxed. At the same time, a measurement of an elapsed time ctqtmp from a commencement of relaxation of the limitation of the drive force is started.

Then, it is determined whether or not the elapsed time ctqtmp measured by a timer has exceeded a predetermined time×4 (at step S11). If the elapsed time ctqtmp has not yet exceed the time×4 so that the answer of step S11 is NO, the routine advances to step S12 to determine whether or not the turning performance improving control execution flag tqcntex is maintained to "1". That is, it is determined whether or not the turning performance improving control is still continued.

If the turning performance improving control execution flag tqcntex is still set to "1", that is, if the turning performance improving control is in execution so that the answer of step S12 is YES, the routine is returned to step S11 to repeat the determination.

By contrast, if the elapsed time ctqtmp has exceeded the time×4 so that the answer of step S11 is YES, the routine advances to step S13. Likewise, if the turning performance improving control execution flag tqcntex has been set to "0", that is, if the turning performance improving control has been terminated so that the answer of step S12 is NO, the routine also advances to step S13. Consequently, the relaxation of the restriction of the drive force control amount by altering the limit value tqgd to the limit value tqgdtmp is continued until the elapsed time ctqtmp exceeds the time×4. In this case, the relaxation of the drive force control amount executed by thus changing the limit value tqgd to the limit value tqgdtmp will be terminated when the turning performance improving control is terminated even if the elapsed time ctqtmp has not yet exceed the predetermined time×4.

At step S13, specifically, the limit value tqgdtmp of the control amount of the drive force during the turning performance improving control is altered to the regular limit value tqgd. That is, the relaxation of restriction of the drive force is terminated. At the same time, the elapsed time ctqtmp from the commencement of the relaxation is reset to 0. Then, the routine is ended.

Figure 4:
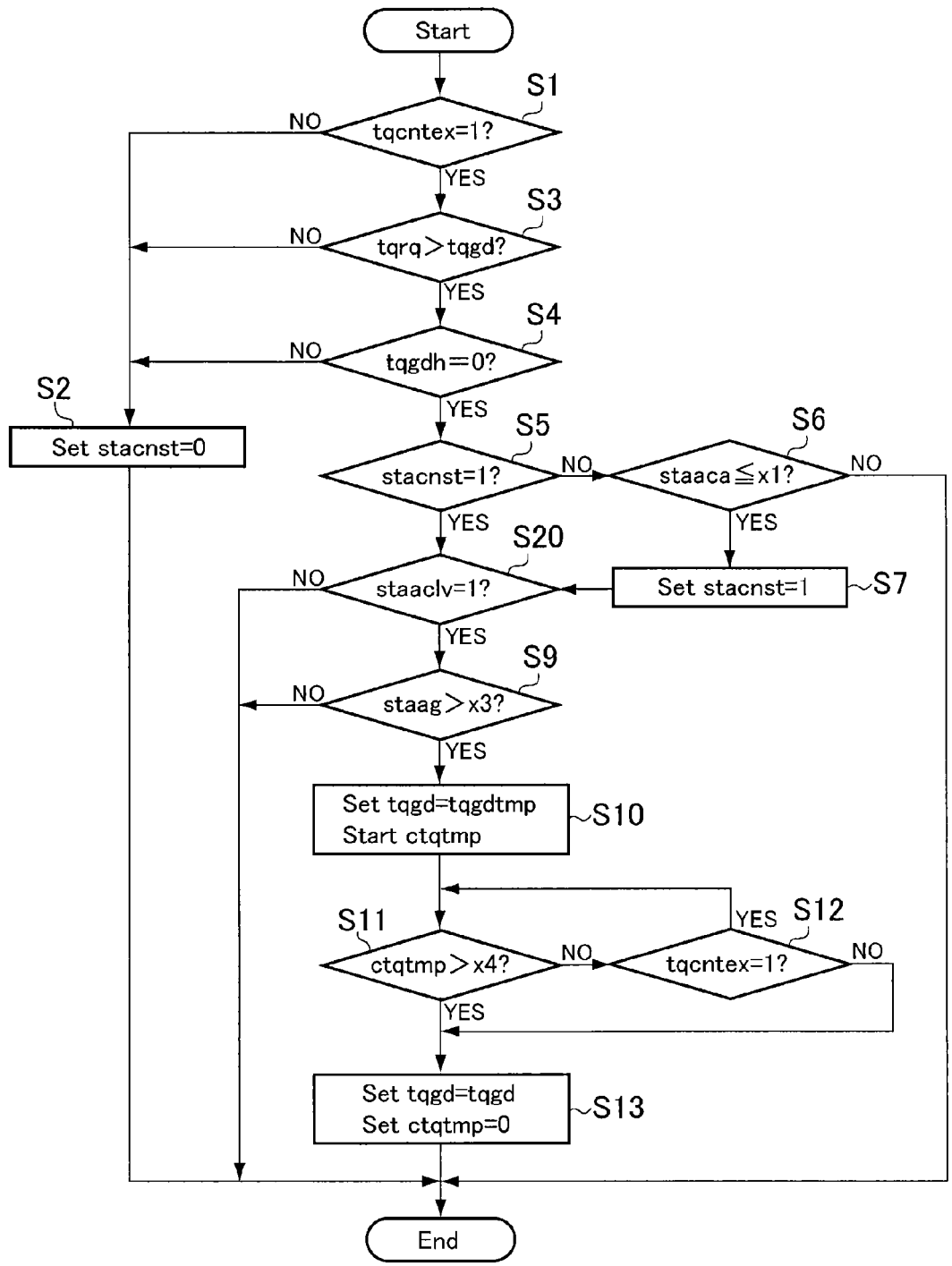
FIG. 4 is a flowchart for explaining another example of turning performance improving control carried out by the control system according to the present invention.

The control of step S8 shown in FIG. 3 may be modified as step S20 shown in FIG. 4. According to the example shown in FIG. 4, specifically, an increase determination flag stssclv of the steering angular velocity staaca is used to determine an execution of the angle increasing operation during turning, in addition to the steering operation determination flag stacnst. This increase determination flag stssclv is set to "1" when an increment of the steering angular velocity staaca of the steering operation is determined under the condition that the steering operation determination flag stacnst is set to "1", and set to "0" in any other case.

For example, an increment of the steering angular velocity staaca may be determined if a deviation between a current steering angular velocity staaca_$i$ and a previous value staaca_$_{i-1}$ of the steering angular velocity staaca is larger than a predetermined value×5.

As the control example shown in FIG. 3, according to the example shown in FIG. 4, in case the steering operation determination flag stacnst is set to "1" so that the answer of step S5 is YES, the routine advances to step S20. Also, if the steering angular velocity staaca is lower than or equal to the steering angular velocity×1 so that the answer of step S6 is YES, the routine advances to step S7 to set the steering operation determination flag stacnst to "1", and further advances to step S20. At step S20, it is determined whether or not the increase determination flag stssclv is set to "1".

If the increase determination flag stssclv is set to "0" so that the answer of step S20 is NO, the routine is ended without carrying out subsequent controls.

By contrast, if the increase determination flag stssclv is set to "1" so that the answer of step S20 is NO, as the control example shown in FIG. 3, the routine advances to step S9 to determine whether or not the current steering angle staag is larger than the predetermined steering angle×3. If the steering angle staag is larger than the steering angle×3 so that the answer of step S9 is YES, the control system determines a fact that the steering angle increasing operation is determined to have been carried out.

In case of determining an execution of the steering angle increasing operation based on the steering angular velocity staaca, such determination would be effected by a variation in the steering operation within a region where the steering angle staag is small (i.e., close to 0). In order to avoid such disadvantage, the execution of the steering angle increasing operation is determined based on a fact that the steering angle staag is larger than the threshold value such as the steering angle×3. Therefore, accuracy of the determination can be improved while avoiding erroneous determination.

Optionally, a plurality of flags may be used to determine state of steering operation plurality of times during execution of the turning performance improving control. In this case, accuracy of the determination can be further improved.

Alternatively, the determination at step S6 in the foregoing examples may also be made based on a fact that a deviation between the current angular velocity staaca_$i$ and the previous value taaca_$i-1$ of the steering angular velocity staaca is smaller than a predetermined value×6. In this case, the steering operation determination flag stacnst will be set to "1" if the deviation between the current angular velocity staaca_$i$ and the previous value taaca_$i-1$ of the steering angular velocity staaca is smaller than the predetermined value×6.

Figure 5:
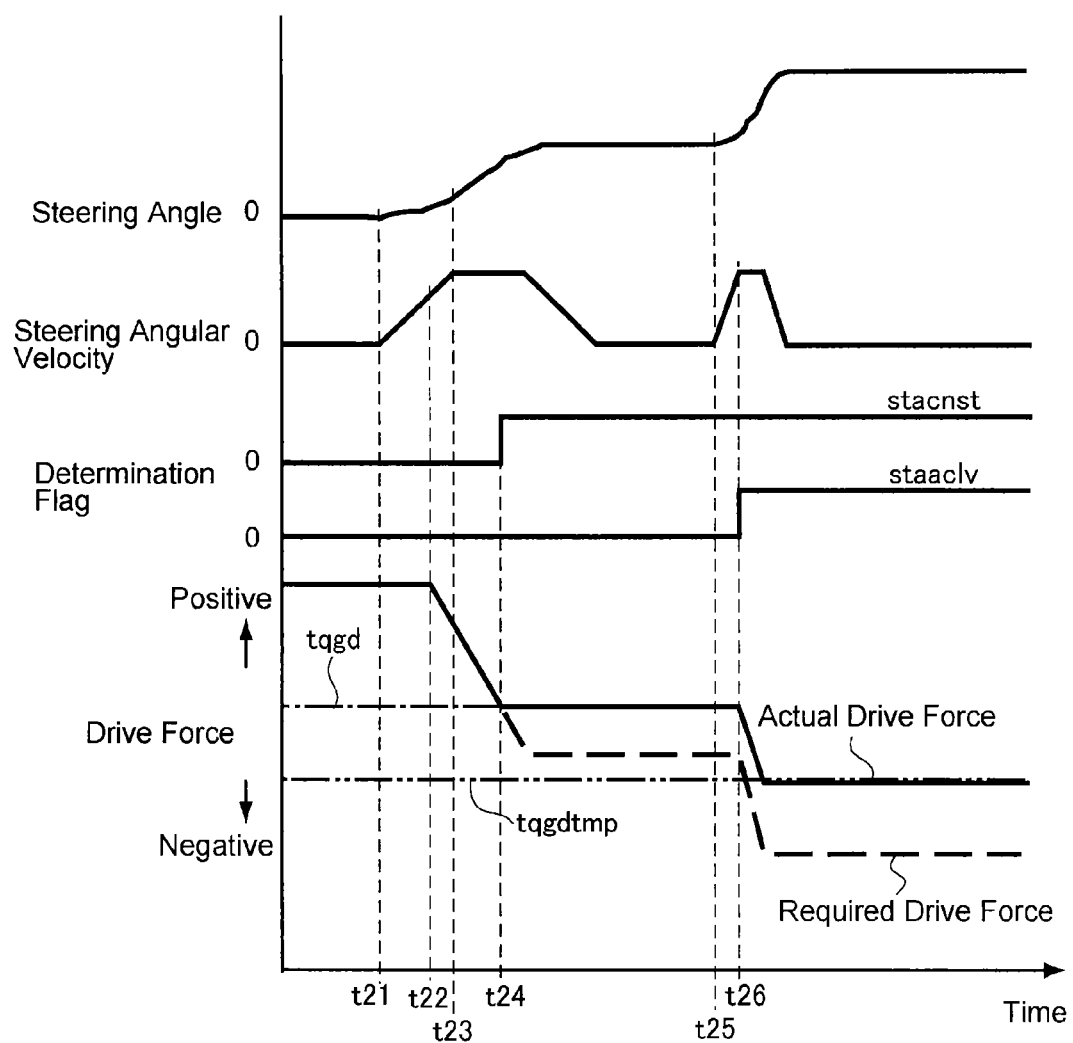
FIG. 5 is a time chart for explaining another example of turning performance improving control carried out by the control system according to the present invention.

Referring now to FIG. 5, there is shown a time chart indicating changes in the drive force of the vehicle Ve during execution of another example of the turning performance improving control of the present invention. In the example shown in FIG. 5, a steering operation is started at point t21 so that the steering angle staag and the steering angular velocity staaca are increased. The turning performance improving control is commenced at point t22 when the steering angular velocity staaca exceeds a predetermined value. Specifically, the drive force of the vehicle Ve is controlled to be increased in the negative direction. In other words, the drive force of the vehicle Ve is reduced in a predetermined control amount. Consequently, an actual drive force of the vehicle Ve is lowered to the limit value tqgd, and then stabilized at the limit value tqgd.

Meanwhile, an increment of the steering angular velocity staaca stops so that the steering angular velocity staaca is stabilized at point t23, the steering operation determination flag stacnst is set to "1" (a time t24). As described, this determination flag stacnst is set to "1" if the flowing inequality $$staaca\_i - staaca\_{i-1} < \times 6$$

is satisfied, where staaca_$i$ is a current value of the steering angular velocity staaca, staaca_$i-1$ is a previous value of the steering angular velocity staaca, and ×6 is a determination threshold value. Here, the steering angular velocity staaca includes both steering angular velocities of steering operations for turning the vehicle Ve to right and to left.

According to the example shown in FIG. 5, an execution of the steering angle increasing operation is determined based on a changing tendency of the steering angular velocity staaca during turning. Specifically, as shown in FIG. 5, an increment of the steering angular velocity staaca in a current turning direction is stopped at point t23 and stabilized after point t23. In this situation, an execution of the angle increasing operation is determined if the steering angular velocity staaca is again increased in the same direction under the condition that the determination flag stacnst is set to "1".

In the example shown in FIG. 5, specifically, the determination flag stacnst is turned to "1" at point t24, and the steering angular velocity staaca is again increased in the same direction at point t25. Then, when the steering angular velocity staaca reaches a predetermined value at point t26, the control system determines a fact that the steering angle increasing operation is executed. Specifically, the increase determination flag stssclv of the steering angular velocity staaca is set to "1" at the time t26. That is, the increase determination flag stssclv is set to "1" if the flowing inequality $$staaca\_i - staaca\_{i-1} > \times 5$$

is satisfied, where staaca_$i$ is a current value of the steering angular velocity staaca, staaca_$i-1$ is a previous value of the steering angular velocity staaca, and ×5 is a determination threshold value.

Then, when the execution of the steering angle increasing operation is determined at the point t26, the restriction of the drive force is relaxed. Specifically, an upper limit of the control amount of the drive force is altered from the limit value tqgd to the limit value tqgdtmp to increase the control amount of the drive force.

Thus, according to the example shown in FIG. 5, an execution of the steering angle increasing operation is determined based on the changing tendency of the steering angular velocity staaca, and the increase determination flag stssclv for determining the angle increasing operation is turned on when the steering increasing operation is determined. That is, the increase determination flag stssclv is turned to "1" upon satisfaction of two conditions. Therefore, errors and noises will be eliminated to determine an execution of the steering angle increasing operation accurately.

Figure 6:
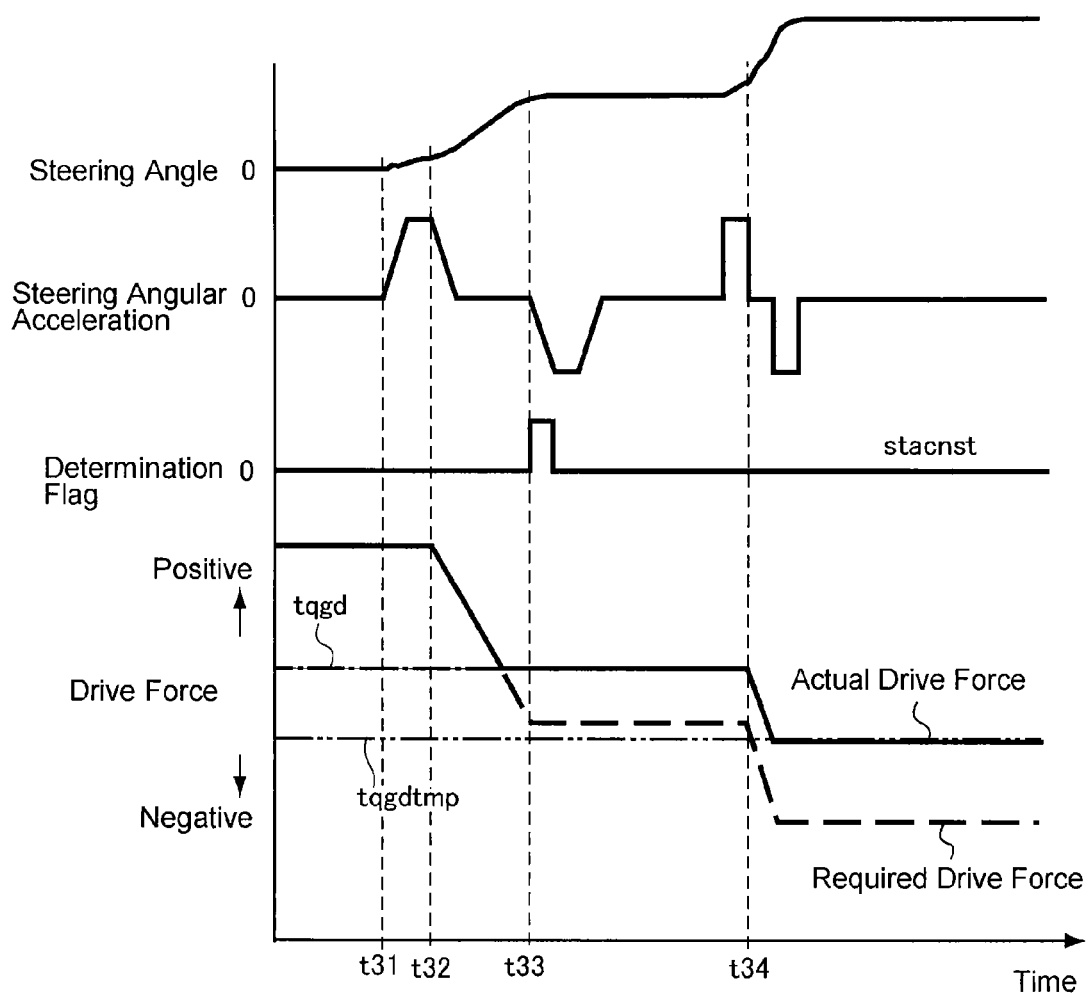
FIG. 6 is a time chart for explaining another example of turning performance improving control carried out by the control system according to the present invention.
Figure 7:
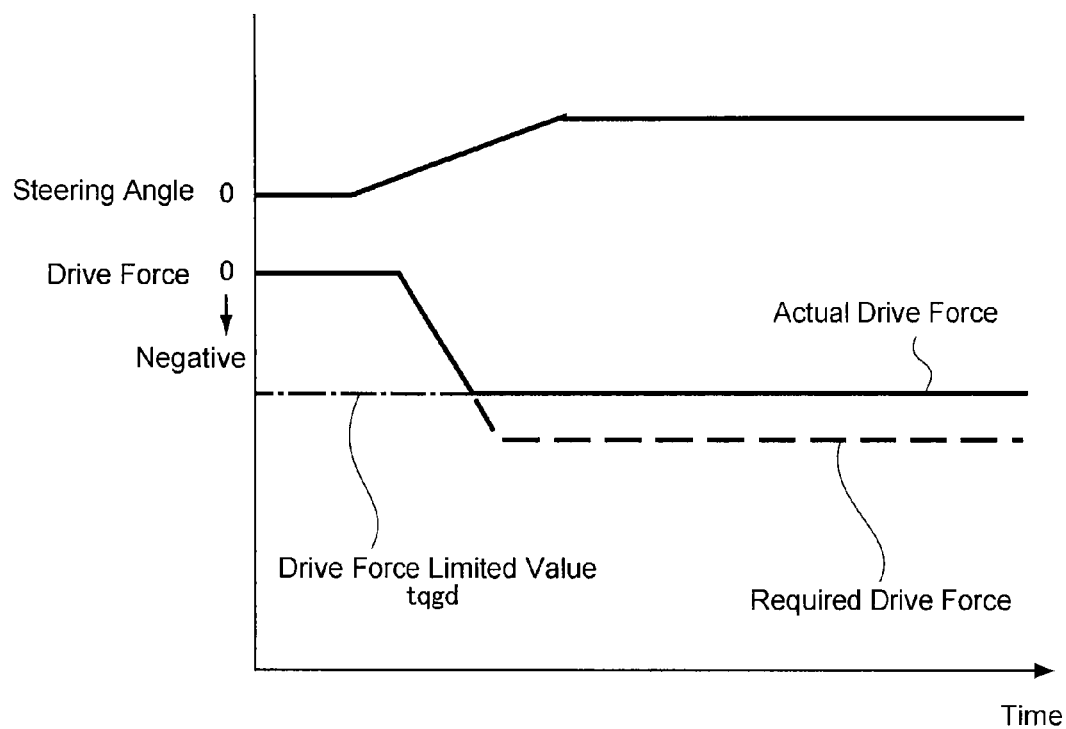
FIG. 7 is a time chart for explaining an example of conventional turning performance improving control.
Figure 8:
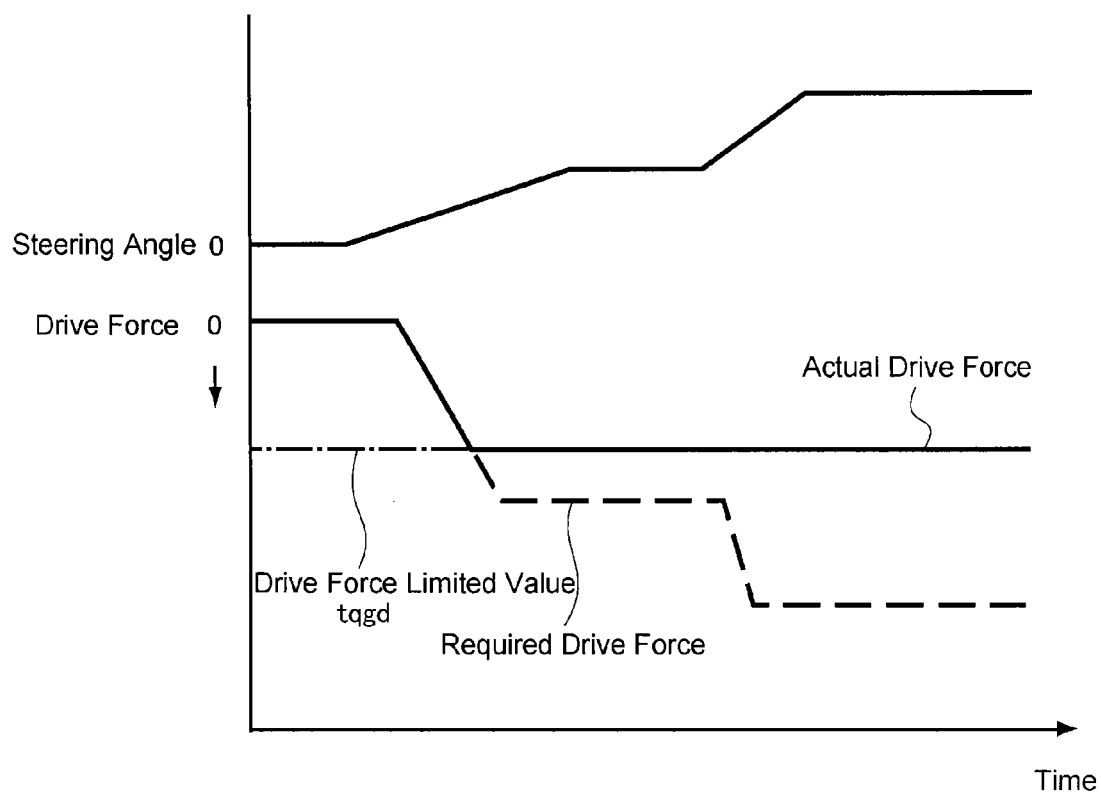
FIG. 8 is a time chart for explaining another example of conventional turning performance improving control.

A referring now to FIG. 6, there is shown a time chart indicating changes in the drive force of the vehicle Ve during execution of still another example of the turning performance improving control of the present invention. As described, according to the example shown in FIG. 5, an execution of the angle increasing operation is determined based on a changing tendency of the steering angular velocity staaca. Alternatively, according to the example shown in FIG. 6, an execution of the angle increasing operation is determined based on a changing tendency of steering angular acceleration.

In the example shown in FIG. 6, a steering operation is executed at point t31 so that the steering angle is increased after the point t31. Then, the turning performance improving control is commenced at point t32 the steering angular acceleration is stabilized to predetermined value. Specifically, the drive force of the vehicle Ve is controlled to be increased in the negative direction. In other words, the drive force of the vehicle Ve is reduced in a predetermined control amount.

Then, the steering angular acceleration starts lowering from point t32, and the steering operation determination flag stacnst is set to "1" at point t33 when the steering angular acceleration becomes 0. Specifically, the determination flag stacnst is set to "1" when the steering angular velocity staaca is once increased by a steering operation and then reduced to be a negative value by fixing the steering angle staag at a predetermined angle.

As described, according to the example shown in FIG. 6, an execution of the angle increasing operation is determined based on a changing tendency of steering angular acceleration. In the example shown in FIG. 6, specifically, an increment of the steering angle staag in the turning direction is stopped at point t33 and stabilized thereafter, and the determination flag stacnst is set to "1" at point t33. Then, when the steering angle staag is again increased in the same direction, the control system determines a fact that the steering angle increasing operation is executed.

In the example shown in FIG. 6, specifically, the determination flag stacnst is turned to "1" at the point t33, and then the execution of the angle increasing operation is determined at point t34 when the steering angular acceleration again increases in the positive direction.

When the execution of the angle increasing operation is determined at the time t34, the restriction of the drive force is relaxed. That is, the upper limit of the control amount of the drive force is altered from the limit value tqgd to the limit value tqgdtmp to increase the control amount of the drive force.

Thus, according to the example shown in FIG. 6, an execution of the steering angle increasing operation is determined based on a changing tendency of the steering angular acceleration, and the steering operation determination flag stacnst is turned on when the steering increasing operation is determined. That is, both the determination of the steering angle increasing operation and the determination for setting the determination flag stacnst to "1" are carried out. Therefore, errors and noises will be eliminated to determine an execution of the steering angle increasing operation accurately.

As described, according to the present invention, the vehicle control system is configured to carry out the turning performance improving control during turning to stabilize vehicle behavior by automatically controlling the drive force of the vehicle Ve. Specifically, in order to prevent a driver from feeling uncomfortableness or shocks resulting from a change in drive force, the drive force or a control amount (or a changing amount) thereof is restricted by the predetermined limit value during execution of the turning performance improving control.

As also described, an execution of the steering angle increasing operation is determined during the execution of the turning performance improving control. If the execution of the steering angle increasing operation is determined, the limit value of the drive force or the control amount thereof for avoiding uncomfortableness resulting from a change in the drive force and for managing operation states of the prime mover 5 and the battery is temporarily changed to increase the control amount of the drive force. That is, the restriction of change in the drive force is temporarily relaxed during the turning performance improving control. If the steering angle increasing operation is performed during execution of the turning performance improving control, the control is required be enhanced. However, according to the present invention, the control effect of the turning performance improving control can be ensured even if the steering angle increasing operation is performed during execution of the turning performance improving control. In addition, the driver can be prevented from feeling different type of uncomfortableness due to a failure in provision of the expected control effect of the turning performance improving control. Thus, according to the present invention, the turning performance improving control can be appropriately executed.

Here will be briefly explained a relation between the foregoing examples and the present invention. The functional means of steps S5 to S9 serve as the "steering detecting means" of the present invention, and functional means of steps S10 to S13 serve as the "restriction relaxing means" of the present invention.

According to the foregoing preferred examples, the vehicle control system of the present invention is applied to a rear-drive layout vehicle in which power of the prime mover 5 is delivered to the rear wheels 3 and 4 to generate drive force of the vehicle. However, the vehicle control system of the present invention may also be applied to a front-wheel layout vehicle in which power of the prime mover 5 is delivered to the front wheels 1 and 2, and to a four-wheel drive vehicle in which power of the prime mover 5 is distributed to all the front and rear wheels 1, 2, 3 and 4.

Given that the vehicle Ve is a four-wheel drive vehicle, a distribution ratio of the power of the prime mover 5 to the front wheels 1 and 2, and to the rear wheels 3 and 4 may be changed arbitrarily instead of changing the drive force during the turning performance improving control. In this case, flexibility of the drive force control during the turning performance improving control can be enhanced so that the turning performance improving control can be executed more appropriately.

As described above, the drive force or control amount thereof is restricted not only to reduce uncomfortableness during the turning performance improving control but also to control operation states of the prime mover 5 and the battery. For example, in case an engine serves as the prime mover 5, the drive force will be restricted to control the operation state of the engine in the following cases:

(1) In case a temperature of the engine is high, the drive force is restricted as a result of restricting maximum input/output of the engine. In this case, if the vehicle is propelled, output of the engine is restricted to avoid overheating of the engine. By contrast, if an engine braking force is applied to the vehicle, the drive force is restricted as a result of restricting input of torque from the drive wheel to the engine to avoid overheating of the engine.

(2) In case a temperature of the engine is low, the drive force is restricted as a result of restricting an engine output to protect catalyst. Also, the drive force is restricted as a result of restricting input/output to/from the engine to ensure lubricant in the engine.

Alternatively, in case a motor is used as the prime mover in a hybrid car or an electric car, the drive force will be restricted to control the battery exchanging electric power with the motor in the following cases:

(1) In case of restricting input/output of the motor to improve durability of the battery by reducing charging/discharging frequencies of the battery.

(2) In case of restricting input/output of the motor to avoid overheating of the battery and protect the battery at low temperature.

(3) In case an SOC of the battery is low and an output of the motor is therefore restricted.

(4) In case the SOC of the battery is high and an input torque to the motor from the drive wheels is therefore restricted.

The vehicle control system of the present invention may appropriately execute the turning performance improving control even if the control amount of the drive force is restricted to control operation states of the prime mover 5 and the battery as mentioned above, as the foregoing example in which the control amount of the drive force is restricted to reduce uncomfortableness or shocks. Specifically, in the above-mentioned cases, the limit value for the drive force or the control amount thereof for controlling operation states of the prime mover 5 and the battery is temporarily changed to increase the control amount of the drive force. In other words, the restriction of a changing amount of the drive force is temporarily relaxed during the turning performance improving control. For example, even if the drive force is restricted to avoid overheating of the prime mover 5 or to protect the battery, such restriction of the drive force can be temporarily relaxed for a short period of time. As described, if the steering angle increasing operation is performed during execution of the turning performance improving control, the control is required be enhanced. However, according to the present invention, the control effect of the turning performance improving control can be sufficiently ensured even if the steering angle increasing operation is performed when restricting the drive force or the control amount thereof to control operation states of the prime mover 5 and the battery.

REFERENCE SIGNS LIST

1 and 2 . . . front wheel, 3 and 4 . . . rear wheel, 5 . . . prime mover, 6 . . . electronic control unit (ECU), 7, 8, 9, and 10 . . . braking device, 11 . . . brake actuator, 15 . . . wheel speed sensor, 16 . . . longitudinal acceleration sensor, 17 . . . lateral acceleration sensor, 18 . . . yaw rate sensor, and Ve . . . vehicle.

The invention claimed is:

1. A vehicle control system that is configured to stabilize vehicle behavior by controlling drive force during turning, comprising:
a control unit that is configured to:
determine an execution of a steering operation of a driver based on a detection signal from a sensor; and
restrict the drive force during controlling the drive force to stabilize behavior of the turning vehicle; and
temporarily change the drive force in a direction of changing the drive force to stabilize the vehicle behavior, when the steering operation of the driver detected while restricting the drive force is carried out to increase a steering angle during controlling the drive force to stabilize the behavior of the turning vehicle,
wherein the control unit is further configured to:
restrict a control amount of the drive force by a predetermined limit value during controlling the drive force to stabilize behavior of the turning vehicle,
stabilize the limit value in a case when the steering operation of the driver is not carried out to increase a steering angle, and
temporarily change the drive force by temporarily changing the limit value in a direction to increase the control amount such that the control amount of the drive force does not follow a required drive force and uncomfortableness or shocks will not be caused by temporarily changing the limit value.

2. The vehicle control system according to claim 1, wherein the control unit is further configured to obtain a steering angular velocity; and to determine a fact that the steering operation is carried out to increase the steering angle when the steering angular velocity is increased after being stabilized or decreased.

3. The vehicle control system according to claim 1, wherein the control unit is further configured to obtain a steering angular acceleration, and to determine a fact that the steering operation is carried out to increase the steering angle when the steering angular acceleration is increased after being decreased.

4. The vehicle control system according to claim 1, wherein the control unit is further configured to restrict the drive force or the control amount by restricting an output of a prime mover of the vehicle, and to temporarily change the drive force or temporarily increase the control amount by controlling a braking device of the vehicle when restricting the drive force or the control amount by restricting the output of the prime mover.

5. The vehicle control system according to claim 2, wherein the control unit is further configured to restrict the drive force or the control amount by restricting an output of a prime mover of the vehicle, and to temporarily change the drive force or temporarily increase the control amount by controlling a braking device of the vehicle when restricting the drive force or the control amount by restricting the output of the prime mover.

6. The vehicle control system according to claim 3, wherein the control unit is further configured to restrict the drive force or the control amount by restricting an output of a prime mover of the vehicle, and to temporarily change the drive force or temporarily increase the control amount by controlling a braking device of the vehicle when restricting the drive force or the control amount by restricting the output of the prime mover.

7. The vehicle control system according to claim 1, wherein the control unit is further configured to terminate the temporary change of the drive force when the steering operation to increase the steering angle is terminated.

8. The vehicle control system according to claim 1, wherein the control unit is further configured to terminate the temporary change of the drive force after a lapse of a predetermined period of time from a commencement of the temporary change of the drive force.

9. A vehicle control system that is configured to stabilize vehicle behavior by controlling drive force during turning, comprising:
circuitry configured to:
determine an execution of a steering operation of a driver based on a detection signal from a sensor; and
restrict the drive force during controlling the drive force to stabilize behavior of the turning vehicle; and
temporarily change the drive force in a direction of changing the drive force to stabilize the vehicle behavior, when the steering operation of the driver detected while restricting the drive force is carried out to increase a steering angle during controlling the drive force to stabilize the behavior of the turning vehicle,
wherein the circuitry is further configured to:
restrict a control amount of the drive force by a predetermined limit value during controlling the drive force to stabilize behavior of the turning vehicle,
stabilize the limit value in a case when the steering operation of the driver is not carried out to increase a steering angle, and
temporarily change the drive force by temporarily changing the limit value in a direction to increase the control amount such that the control amount of the drive force does not follow a required drive force and uncomfortableness or shocks will not be caused by temporarily changing the limit value.

10. The vehicle control system according to claim 1, wherein the control unit is further configured to terminate the controlling of the drive force if restriction of the drive force is intended to prevent an overheating of a prime mover and to protect a battery.

11. The vehicle control system according to claim 9, wherein the circuitry is further configured to terminate the controlling of the drive force if restriction of the drive force is intended to prevent an overheating of a prime mover and to protect a battery.

\* \* \* \* \*